INVENTOR.
FREDERICK L. PFEIFFER
BY
Samuel Branch Walker
ATTORNEY.

Aug. 28, 1962    F. L. PFEIFFER    3,051,721
PIGMENTARY COPPER PHTHALOCYANINE IN THE
"R" FORM AND ITS PREPARATION
Filed Jan. 13, 1959    3 Sheets-Sheet 3
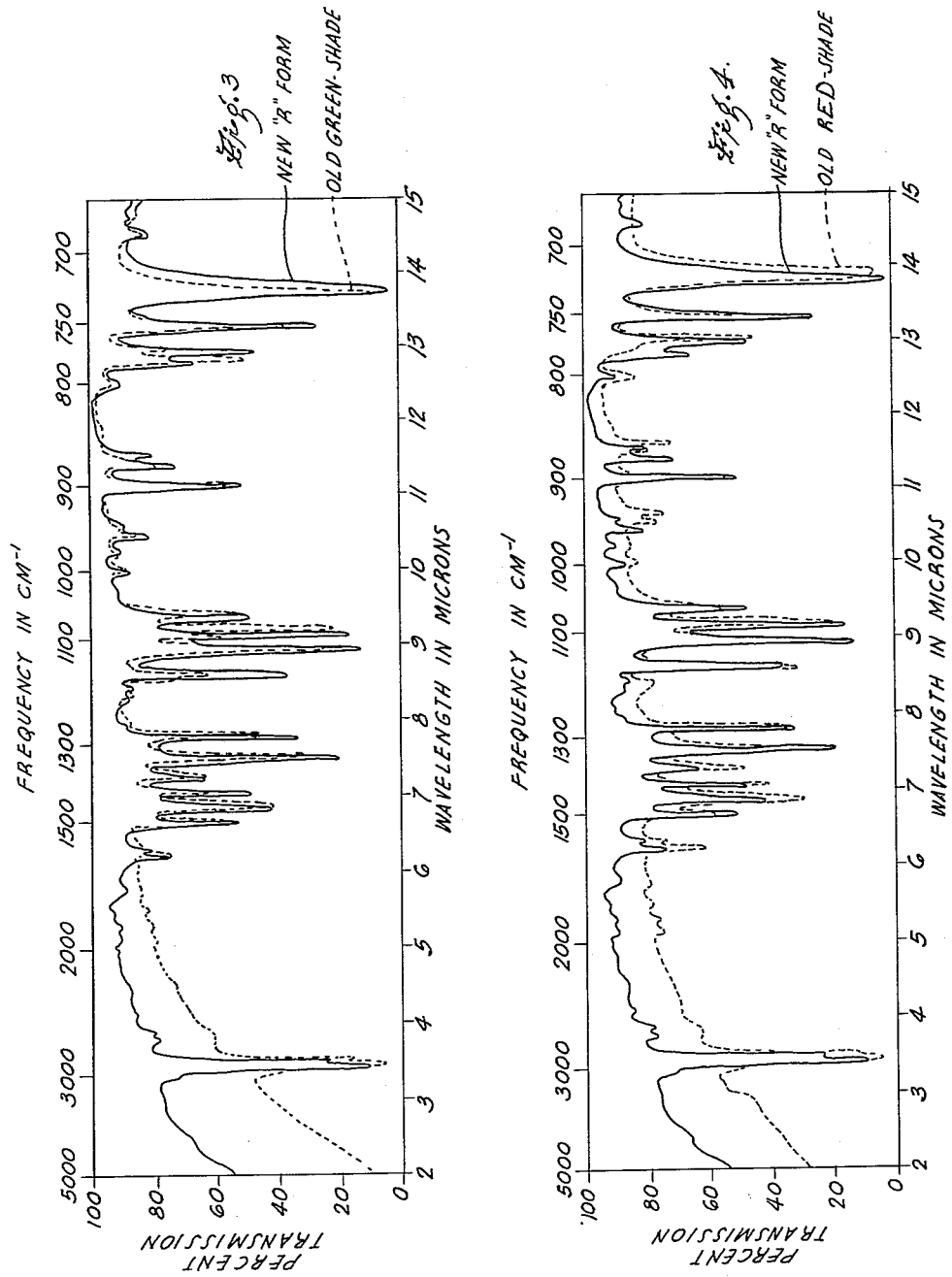
INVENTOR.
FREDERICK L. PFEIFFER
BY
Samuel Branch Walker
ATTORNEY.

3,051,721
PIGMENTARY COPPER PHTHALOCYANINE IN THE "R" FORM AND ITS PREPARATION
Frederick L. Pfeiffer, Chatham, N.J., assignor to American Cyanamid Company, New York, N.Y., a corporation of Maine
Filed Jan. 13, 1959, Ser. No. 786,485
5 Claims. (Cl. 260—314.5)

This invention relates to (1) an unsubstituted, new, solvent-stable, non-crystallizing, metal phthalocyanine having a characteristic structure, as shown by X-ray diffraction and infra-red absorption, herein defined as the "R" form; and (2) one method for synthesizing said phthalocyanine using high shear stresses, and (3) a continuous method of producing metal phthalocyanines not necessarily in said new form.

Phthalocyanine pigments are of marked utility commercially because of their great strength and stability. The phthalocyanines in general and metallic phthalocyanines such as copper phthalocyanine particularly have been known to exist in two common crystal forms which are interconvertible. Copper phthalocyanine, not otherwise substituted, is the most common of the phthalocyanine pigments.

The blue pigment, copper phthalohyanine, exists in a green-shade, solvent-stable, thermodynamically-stable form which exhibits the characteristic Robertson X-ray diffraction pattern. In finely-divided or pigmentary form this green-shade phthalocyanine blue is described and claimed in United States patent to R. H. Wiswall, Jr., 2,486,351, October 25, 1949, "Solvent Stable Metal Phthalocyanine Pigments and Method of Making the Same." This crystalline form has been described as the alpha form in publications by the American Cyanamid Company and the beta form in publications by E. I. du Pont and Co., with certain supporting adherents to each nomenclature. This form will be called the green-shade form elsewhere in this application.

The red-shade, solvent-unstable, thermodynamically metastable form is obtainable by acid pasting any of the known forms of copper phthalocyanine. This form is also previously known as the beta or alpha form depending upon the school of thought used by various authors. This form is called the red-shade form elsewhere in this application.

Considerable efforts have been made by many parties to convert one of these forms to the other. The above Wiswall patent discloses a method of obtaining the green shade in pigmentary form; and acid pasting yields the red shade in pigmentary form. Certain treatments of each form have been used to improve their pigmentary properties, which include dispersibility, strength, solvent resistance, flocculation resistance, etc.

While not as much used commercially, phthalocyanines are known in which the center of the molecule is occupied by one atom of cobalt, nickel, or zinc, or two of hydrogen, etc. Each of these has been known to exist in the two crystal forms. An article "Infra-Red Spectra of Organic Compounds Exhibiting Polymorphism," A. A. Ebert, Jr. et al., J. Am. Chem. Soc. 74, 2806 to 2810 (1952) shows X-ray diffraction patterns and infra-red spectra of the "alpha" (red-shade) and "beta" (green-shade) form (Du Pont nomenclature) of each of phthalocyanine, copper phthalocyanine, cobalt phthalocyanine, nickel phthalocyanine, and zinc phthalocyanine.

In "The Chemistry of Synthetic Dyes and Pigments," H. A. Lubs, Reinhold Publishhing Corp., New York, 1955, at pages 581 and 582, the size of the radius of the central gap in the phthalocyanine molecule is given as 1.35 A. Either two atoms of hydrogen or one atom of a metal may be placed in the center of the structure. Metals which have an atomic radius close to this value give more stable phthalocyanine compounds. Metals which have a slightly smaller radius such as nickel, iron, cobalt, copper and zinc give particularly stable metal phthalocyanines although metals such as antimony and tin which are slightly larger also give useful phthalocyanines. Metals which have an atomic radius markedly different from the value of 1.35 A. also form phthalocyanines but such phthalocyanines are less stable and the metal may be more easily replaced by the action of an acid to give the metal free phthalocyanine. The phthalocyanines which have the proper size of metal atom are extremely stable towards acids, alkalis, solvents, temperature, and other influencing factors.

In the past phthalocyanines have been usually produced by reactions of orthodinitriles or orthodicarboxylic acid derivatives including such reagents as phthalonitriles, phthalimide, phthalic acid, phthalic anhydride, etc. in the presence of metallic salts and materials such as urea, ammonia, etc. Various solvents may be used in these reactions. The phthalic acid ring may also be substituted by halogens, and such groups as alkyl groups, phenyl groups, etc. and still react to form phthalocyanines. Such phthalocyanines contain benzene rings which are still substituted by the original substituent group. The products obtained by synthesis are generally not useful as pigments until after further treatment and conditioning such as acid pasting and salt grinding to reduce impurity content, modify the particle size, etc.

The phthalocyanines of the present invention are of a new crystal form. As a result the X-ray diffraction data, infra-red absorption data, etc. are different. The new form is hereinafter referred to as the "R" form. When in pigmentary form, for copper phthalocyanine, the "R" form is redder than the old red shade copper phthalocyanine, and is stronger than the old form. By the Munsell system, the old red shade has a hue of 10B, a value of 6 and a chroma of 6; the new "R" form has a hue of 5PB, a value of 5 and a chroma of 10; for standard zinc oxide printing ink tints. The new "R" form is from 20% to 40% stronger than conventional acid pasted copper phthalocyanine pigments.

Whereas the crysals may be larger, to be advantageously used as a pigment, the particles should have an average maximum dimension of less than 2 microns. Better results as a pigment are usually obtained when the average particle size is in the range of from 0.02 to 0.5 micron or smaller. As is set forth in the Ebert article, supra, the "alpha" and "beta" form of each of the various phthalocyanines including copper, unsubstituted, cobalt, nickel, and zinc are in general fairly similar to the same form of the other phthalocyanines as regards their X-ray diffraction pattern and infra-red absorption patterns. There are, nonetheless, minor differences due to the variation in the central atom even among the various metal phthalocyanines. The resemblances in the curves for the similar form of various metal phthalocyanines are particularly noticeable in the X-ray diffraction pattern. In the X-ray diffraction structure, the shape and size of the peaks is influenced by the state of division of the samples. For very finely divided pigments the smaller peaks may be broadened or merged, or become more difficult to observe and specify.

To more clearly illustrate the comparison with X-ray diffraction patterns and infra-red patterns, certain of these patterns are shown in the accompanying drawings in which:

FIGURE 3 shows an infra-red absorption curve of the new "R" form copper phthalocyanine as a full line and the old green shade copper phthalocyanine form as a dotted line.

FIGURE 4 shows an infra-red absorption curve of the new "R" copper phthalocyanine form as a full line and the sold red shade form copper phthalocyanine as a dotted line.

Figure 1:
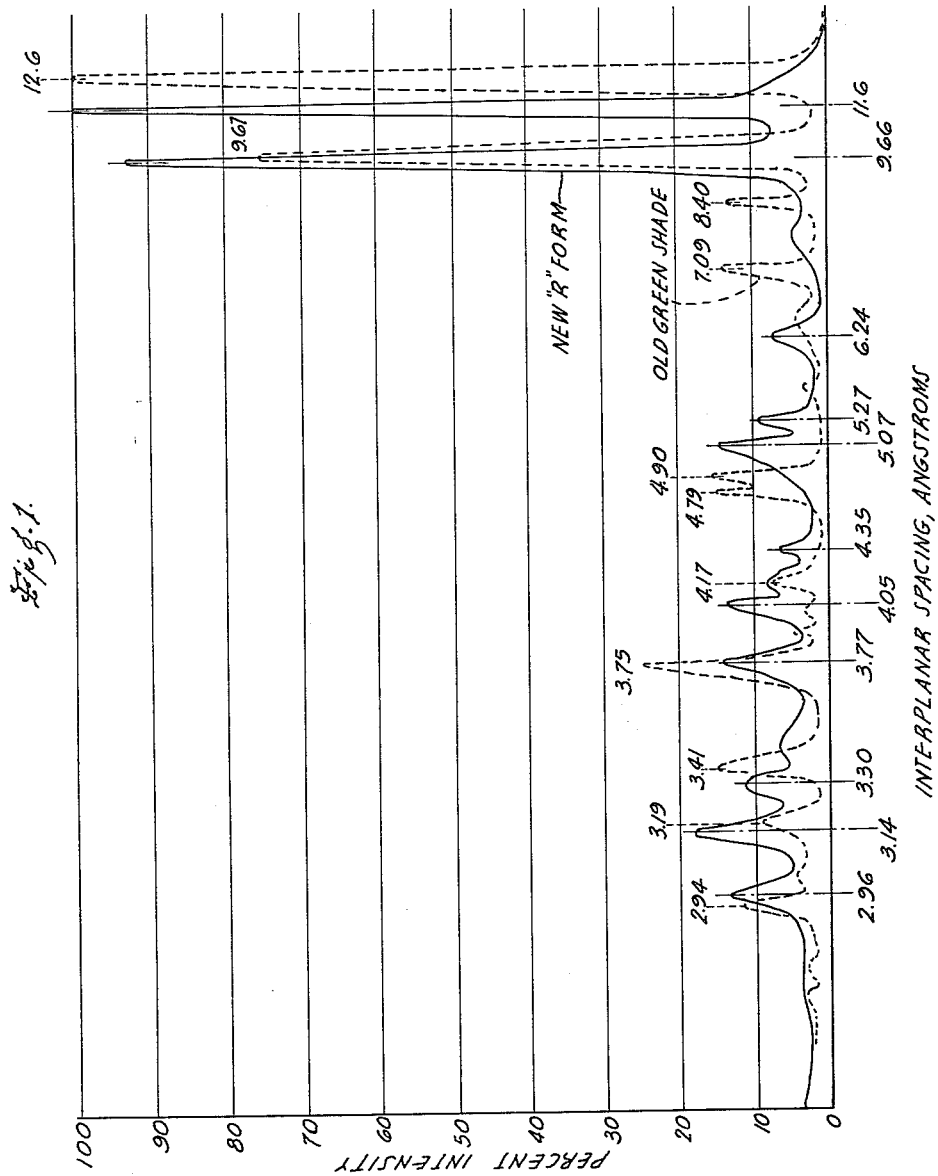
FIGURE 1 shows the curve of the X-ray diffraction pattern plotted as percent intensity of the strongest peak of the new "R" form copper phthalocyanine in full line and the old green shade form copper phthalocyanine in dotted line.
Figure 2:
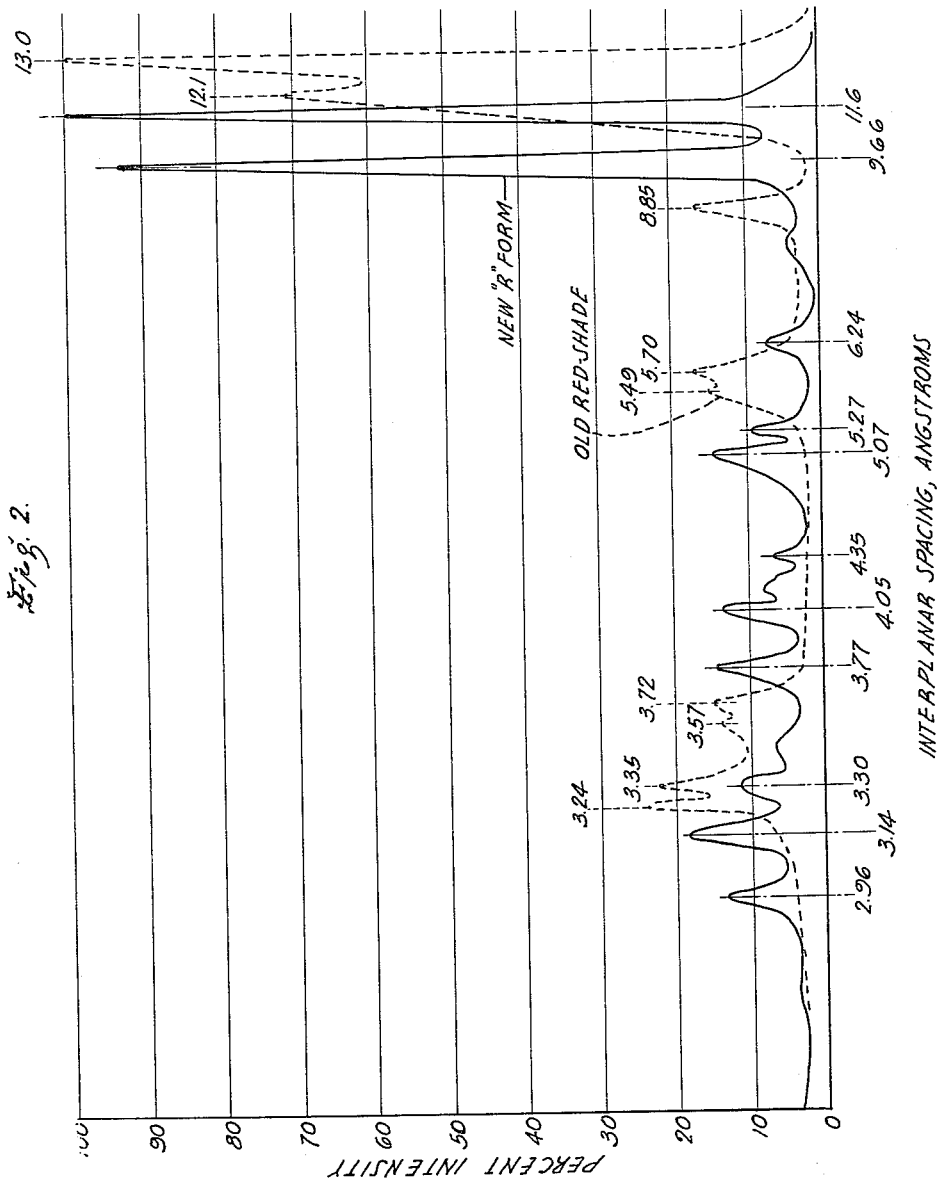
FIGURE 2 shows a pair of curves of the X-ray diffraction pattern of the new "R" form copper phthalocyanine in full line and the old red shade copper phthalocyanine form in dotted line.

The new "R" form of copper phthalocyanine exists as a red shade blue pigment which has improved properties over the old red shade blue pigment regarding both strength or tinctorial power, resistance to crystallization, and flocculation resistance although the flocculation resistance is to a considerable extent a function of the solvent system.

The new "R" form can be converted to the old red shade form by acid pasting, i.e. dissolving the metal phthalocyanine in concentrated sulfuric acid and drowning in water. The identity of molecular structure of the old red shade, the old green shade and the new "R" form is provable by this acid pasting. When any of these three forms of copper phthalocyanine is acid pasted, the same product is obtained. Elemental analysis of any of the three forms confirms the identity thus showing that actually three different crystal forms exist.

An additional old form of copper phthalocyanine is the gamma form disclosed in a patent to J. W. Eastes, 2,770,629, "Preparation of Phthalocyanine Pigments," November 13, 1956.

The X-ray diffraction patterns for copper phthalocyanine showing the interplanar spacing in angstroms and strength figure in percent of the strongest line is as follows:

phthalocyanine shows the wave lengths of characteristic bands of absorption which also serves to distinguish the present novel "R" form. FIGURES 3 and 4 show comparatively the new "R" form and the old red shade and old green shade form. Certain of the characteristic wave bands are shown in the following table:

| "R" Form | | Old Green Shade | | Old Red Shade | |
|---|---|---|---|---|---|
| μ | Cm.⁻¹ | μ | Cm.⁻¹ | μ | Cm.⁻¹ |
| 11.49 (wk.) | 870 | 11.41 (wk.) | 877 | 11.59 (wk.) | 863 |
| 12.91 (med.) | 775 | 12.80 (med.) | 781 | 12.99 (med.) | 769 |
| 13.74 (str.) | 728 | 13.68 (str.) | 731 | 13.88 (str.) | 720 |

The new "R" form may be converted by salt grinding in a dough mixer using hot aniline as the grinding vehicle, at 50° C. to 70° C. to the old green shade form.

The conversion from one form to the other can be confirmed by X-ray or infra-red examination. Also by such examination mixtures may be identified and the relative proportions of each crystal form determined. Mixtures are useful for pigments of intermediate shades.

One commercial method of obtaining a crystallization resistant copper phthalocyanine pigment has been to form the mono-chlorinated derivative. The new "R" form of copper phthalocyanine without speical treatment is as resistant to the phase transformation action of crystallizing solvents and crystal growth in such solvents as is mono-chlorinated copper phthalocyanine. This characteristic is called crystallization resistance in the industry.

The corresponding X-ray diffraction patterns for the stable "R" form of the other metal phthalocyanines including nickel, iron, cobalt, copper, zinc, antimony, and tin phthalocyanines in the "R" form are similar. The slight change in crystal structure induced by the switch from copper to one of these other metals as the central metal atom causes a slight displacement in the peaks due to minor differences in the dimensions of the unit cells of the respective crystals. The infra-red spectra differences are more marked.

For special pigmentary purposes the phthalocyanines of these metals other than copper are useful, but copper phthalocyanine has sufficiently greater stability and strength as to be predominantly industrially the metal phthalocyanine of choice for pigmentary purposes. These metal phthalocyanines in the "R" form may be used as additives for greases in which case their

INTERPLANAR SPACING IN A. AND PERCENT INTENSITY

| New "R" Form | | Old Green Shade | | Old Red Shade | | Old Gamma Form | |
|---|---|---|---|---|---|---|---|
| A. | Percent | A. | Percent | A. | Percent | A. | Percent |
| 11.6 | (100) | 12.6 | (100) | 13.0 | (100) | 13.5 | (100) |
| 9.66 | 92 | 9.67 | 74 | 12.1 | 71 | 11.95 | 97.5 |
| 7.80 | 3 | 8.40 | 14 | 8.85 | 18 | 9.12 | 23 |
| 6.24 | 7 | 7.09 | 14 | 5.70 | 18 | 8.51 | 17 |
| 5.27 | 8 | 6.31 | 6 | 5.49 | 16 | 5.57 | 54 |
| 5.07 | 14 | 5.74 | 5 | 3.72 | 16 | 4.17 | 7 |
| 4.35 | 5 | 4.90 | 15 | 3.57 | 15 | 3.74 | 22 |
| 4.17 | 8 | 4.79 | 15 | 3.35 | 23 | 3.57 | 38 |
| 4.05 | 15 | 4.17 | 7 | 3.24 | 24 | 3.38 | 63 |
| 3.77 | 15 | 4.00 | 5 | | | 3.22 | 26 |
| 3.44 | 6 | 3.87 | 8 | | | 2.95 | 16 |
| 3.30 | 11 | 3.75 | 25 | | | | |
| 3.14 | 19 | 3.41 | 16 | | | | |
| 2.96 | 13 | 3.19 | 9 | | | | |
| 2.89 | 3 | 2.94 | 12 | | | | |
| 2.79 | 3 | 2.79 | 5 | | | | |
| 2.71 | 3 | 2.72 | 5 | | | | |

It is to be noted that the data for the old red shade form differs slightly from that shown in Wiswall Patent 2,486,351 as improved instrumentation has increased the resolution obtainable and therefore more detail can be now shown than is given in the Wiswall patent.

Additionally, infra-red absorption data of copper coloring characteristics are not important. The unique heat stability of the metal phthalocyanines render them particularly suitable as ingredients of lubricants designed for high temperature operations.

One method of producing the new "R" form of metal phthalocyanines involves the fusion of a mixture containing phthalonitrile, urea, and a metalliferous reagent with intense agitation under conditions of high shear at the time of reaction. A high shear appears to be essential to the production of the new "R" form. It would appear that the crystal lattice is actually distorted by mechanical stress during the synthesis and this distortion is essential to the synthesis of the "R" form under fusion conditions. The form and amount of energy input to a system can effect the crystal form.

One fusion method is shown in a U.S. patent to Muehlbauer, 2,212,924, "Production of Phthalocyanine Pigments," August 27, 1940. Example 15 of said patent shows the use of 50 parts of phthalonitrile, there called phthalodinitrile, 150 parts of urea, and 20 parts of cuprous chloride which are intimately mixed, fused at about 120° C. with stirring and with further heating. The reaction is exothermic so the temperature rises.

In the present invention less urea is used which gives a thicker mix and to get the "R" form an intense agitation which gives a high shear is used during the actual formation of the metal phthalocyanine.

Theoretically, stoichiometric relationships would indicate that four molecules of phthalonitrile would react and a single copper atom would be added to yield a phthalocyanine molecule. In other words, the urea has essentially only a catalytic relationship. The chemistry actually is not that simple. One school of thought speculates that urea furnishes ammonia which forms an addition complex which reacts, eliminating ammonia, to give the metal phthalocyanine from the phthalonitrile. Theories based on such speculative chemistry are not an essential part of the present invention.

The most unexpected part of the present invention is the discovery of the affect of the high shear on crystal form. If a low shear rate is used with a high urea usage and a comparatively low temperature, a green shade phthalocyanine of the form disclosed by Muehlbauer is produced. With intermediate shear rates and temperatures a mixture of both green shade and red shade and the new "R" form of copper phthalocyanine is obtained. If the quantity of urea disclosed by Muehlbauer is used or if a solvent is present, as also disclosed by Muehlbauer, the reaction mixture is so fluid above the fusion point of urea that a high rate of shear cannot reasonably be obtained and accordingly no "R" form is produced.

Preferably from about 50 to 100 parts of urea and from about 27 to 100 parts of the metalliferous reagent are used per 100 parts of phthalonitrile. All parts are by weight unless otherwise specified. Whereas the reagents are mixed dry, the temperature of reaction is such that small amounts of moisture such as water of hydration or water absorbed on the reagents is driven off and does not deleteriously affect the reaction. An appropriate correction in weight can be made to allow for a small amount of moisture or water. The metalliferous reagent is of a metal corresponding to the metal desired in the final phthalocyanine. The free metal, the metal oxides, or the metal salts may be used as the metalliferous reagent to furnish the metal for the central metal atom in the phthalocyanine. Whereas with copper phthalocyanine, free copper, or the oxides of copper or a wide variety of copper salts including the cuprous and cupric halides, sulfates, carbonates, acetates, and nitrates may be used, it is particularly convenient to use cupric chloride. Fortunately the halogen does not enter into the reaction and chlorine-free copper phthalocyanine is obtained. The reagents are preferably finely-divided so that intimate contact is more easily obtained. However, in view of the low fusion point of the urea, even fairly coarse particles may be used. Components of 60 mesh or finer give excellent results. The order of addition is not critical. The components may be heated individually or mixed in any order, or in part pre-mixed. It is usually more convenient commercially to grind components to about 60 mesh and blend them uniformly at room temperature before adding to the reaction vessel. The reaction vessel may be either a continuous or batch mixer so that either continuous production or batch production is obtained. Reagents are added to the mixer and the temperature brought up to about 140° C. at which temperature reaction starts, or the reagents are added to the hot mixer. The reaction is exothermic and, accordingly, the temperature climbs. Good results are obtained if the reaction temperature is allowed to climb to 300° C. or higher inasmuch as the phthalocyanine produced is a remarkably temperature-stable organic compound. Most of the reaction occurs before the temperature can reach or exceed these limits, and the temperature rising higher does not harm the product. The time of reaction is not particularly critical. In a continuous reaction mixer a hold up time of one or two minutes is sufficient for the production of some of the metal phthalocyanine. Longer times give better yields. At the higher reaction temperatures a reaction time of 5 to 10 minutes gives excellent results. Because of the stability of the product much longer holding times may be used in the reaction vessel without loss of yield.

The rate of shear and temperature of reaction determines whether the old green shade or the old red shade or the new "R" form is obtained. Measurements of rates of shear are one of the least satisfactory of chemical engineering measurements. Measurements of horse power input have been used but such a measurement requires a completely defined system. High shear rates with excellent yields of "R" form metal phthalocyanines may be obtained in mixers such as the KoKneader (List system) continuous mixers of Baker, Perkins Inc., Chemical Machinery Division, Saginaw, Michigan. This mixer has an interrupted worm thread on a shaft which fits in a cylindrical barrel having interdigitated teeth which fit into the threads so that a mixing action is obtained in the threads. The interruptions in the worm threads are sufficient for the interdigitated teeth to slide back thus giving both a rotation and reciprocation and permitting the threaded shaft to move forward by thread action and then slide backward as the teeth meet the worm thread interruptions. Such a system gives an extremely high shear rate to a very viscous mixture, which is easily controlled. The outer barrel is jacketed for temperature control.

Another system which gives at least some of the "R" form is a continuous double arm mixer having interdigitated heavy block teeth on adjacent rotating shafts. An ordinary sigma arm mixer gives less agitation than is preferred for maximum yields of the "R" form.

An ordinary hand or power driven meat grinder may be used. Such a meat grinder may be jacketed or wrapped with an electric resistance heating element for temperature control and the reaction mixture poured therethrough with hand or power agitation. The shear rate is too low for good yields of "R" form, but good continuous reaction occurs.

Another form of reactor may be made from two lengths of spiral wound shielding such as is used for BX cable. Two different sizes are used, the smaller fitting in the larger and being rotatable therein. A small clearance is preferred. The temperature of the outer shield is controlled by suitable electric resistance elements or other means and the reaction mixture is forced through the annular space between the shield elements as the shields are rotated with respect to each other. An electric motor may be used to rotate the inner shield at a high rate of speed.

Other forms of reaction vessels in which a high shear is obtainable will be obvious to those skilled in the art.

A third phase of the present invention is a continuous method of producing metal phthalocyanines, not necessarily in the new "R" form. It has long been customary to produce phthalocyanines in batch reactions. It has now been found that by using the dry mixture of phthalonitrile, urea, and a metalliferous reagent, as above mentioned for the "R" metal phthalocyanines, and stirring the mixture at least slightly to obtain homogeneity, a continuous method is obtainable in which the reaction mixture is fed continuously to a reactor and the reaction product containing the metal phthalocyanine is discharged. The same types of reactors may be used at a slow drive speed or a sigma arm reactor may be used at normal speed so that only a stirring type of action with comparatively low shear is obtained which thus yields the metal phthalocyanines in the old forms. The hold up time in the reactor is conveniently within the range of about 2 to 10 minutes and the reactor is maintained within the temperature range of about 140° C. to 240° C. Hold up times of as small as one minute at the higher reaction temperatures give a fair yield of the metal phthalocyanine but longer reaction times give improved yields.

The new continuous process for manufacturing metal phthalocyanines may be used with substituted phthalonitriles such as chlorinated phthalonitriles to produce corresponding phthalocyanines such as chlorinated copper phthalocyanine. The substituents on the phthalonitrile so change the crystal structure of the produced substituted metal phthalocyanine that the crystal structures can neither be classed as green shade or "R" form. The scope of substituents on the phthalonitrile is that of conventional practice depending upon the form of metal phthalocyanine to be produced. Also at least part of the urea may be substituted by formamide or ammonia under pressure in the continuous production of the phthalocyanines.

After synthesis, the reaction product containing the metal phthalocyanine which may be in the new "R" form, the old green shade, or a substituted metal phthalocyanine, is treated to remove unreacted urea, metalliferous reagent, and impurities. Purification is simplified when the metalliferous reagent is a water-soluble salt or an oxide which will dissolve in dilute acid. The reaction product, which is granular in form, is mixed with an aqueous extractant, preferably 10 to 25% hydrochloric acid or sulfuric acid, stirred until the impurities are given an adequate chance to dissolve; and then by decantation, centrifugation, or filtration the metal phthalocyanine is separated from the washing acid. One or more extractions may be performed.

The thus produced metal phthalocyanine may be further treated as desired. If the old red shade pigment is preferred, the metal phthalocyanine is dissolved in concentrated sulfuric acid and drowned in water, a process which is well-known in the art. If a high shear rate was used during the synthesis, the product metal phthalocyanine is essentially in the new "R" form and without further treatment has pigmentary properties. The as produced "R" form phthalocyanine blue may be further conditioned by salt grinding, for example, in polyethylene glycol, to further subdivide the pigmentary particles and thus increase the strength of the pigment. If a stirring rate with low shear was used during the synthesis and the metal phthalocyanine is obtained in the old forms, particle size reduction or other treatment is in accordance with conventional procedures.

The scope of the present invention is as set forth in the appended claims, but certain aspects of the present invention are more clearly illustrated in the following examples.

*Example 1*

CONTINUOUS REACTION IN INTERRUPTED SCREW MIXER

An interrupted screw mixer of the KoKneader type in which the mixer barrel has blades between the mixer threads which slide through the interruptions in the blades, is provided with a heat exchange jacket to maintain the temperature of the mixture at about 145° C. A finely ground mixture is prepared from 100 parts of phthalonitrile, 27.4 parts of anhydrous cupric chloride, and 53.4 parts of urea. Each of the components is about 60 mesh and the mixture is blended until uniform. The mixture is fed into the jacketed mixer and the mixer driven so as to have high shear. The reaction mixture passes through the mixer with a retention time of between 3 and 5 minutes. An exothermic reaction takes place in the reaction zone causing the temperature to increase but the jacket prevents the temperature at any point from running above 200° C. The intense agitation of the mixer keeps the reaction product granular as it is discharged. The reaction mixture is slurried with 1250 parts of aqueous 25% sulfuric acid and the pigment is recovered by filtration. A yield of about 85% of theoretical based on the phthalonitrile usage of "R" form copper phthalocyanine is obtained. The X-ray diffraction pattern and infra-red curves obtained on the product are as above identified and indicated for the "R" form copper phthalocyanine. The product obtained is in pigmentary form of from 0.005 to 3 microns particle size, mostly being from 0.2 to 1 micron. The product when dried is a good pigment and shows high color strength.

The "R" form blue pigment as produced is acid pasted by dissolving one part in 15 parts of concentrated sulfuric acid and then drowning the mixture in 100 parts of a mixture of ice and water, filtering, washing, and drying. The thus produced acid pasted pigment is the typical red shade copper phthalocyanine.

The copper phthalocyanine pigment in "R" form as filtered out after the acid washing is further conditioned by salt grinding with polyethylene glycol. 255 grams of microatomized salt, 50 grams of the acid washed "R" form copper phthalocyanine, and 70 milliliters of polyethylene glycol is mixed in a dough mixer starting at 25° C., and rising over 3 hours to 55° C. The mixture is slurried with 2000 milliliters of 10% sulfuric acid, heated to a boil for 3 minutes, filtered and washed acid free, then dried. The refined "R" form pigment thus produced is stronger and redder than the red shade acid pasted copper phthalocyanine pigments. It shows excellent resistance to crystal growth in solvents.

Elemental analysis for carbon, hydrogen, nitrogen, and copper gave results which were within experimental error of the calculated values.

*Example 2*

A commercial double barrel continuous mixer having a twin screw arrangement with interdigitating blocks is fitted with a steam jacket and pre-heated to about 147° C. A mixture of 100 parts of phthalonitrile, 27.2 parts of anhydrous cupric chloride, and 53.2 parts of urea is mixed as in Example 1 and fed to the mixer. The charge has a retention in the reaction chamber of about 4 minutes and is continuously fed and continuously discharged. As the reaction is exothermic, the temperature rises somewhat above the temperature of the jacket.

The reaction product is slurried with 1000 parts of 20% sulfuric acid, filtered out, and dried. The product depending upon the rate of shear in the mixer is from about one-third to two-thirds of the new "R" form. The remainder is both old red shade and both old green shade copper phthalocyanine predominantly old red shade form.

The product when subjected to acid pasting gives an excellent red shade phthalocyanine pigment with an overall yield of about 85% based on phthalonitrile usage.

*Example 3*

WORM THREAD MIXER

A conventional meat grinder of the worm thread type designed for grinding meat in the home is wound with an insulated electric heating tape. 52.4 parts of urea are melted and thereto are added 34.7 parts of cupric chloride dihydrate. After thorough mixing the melt is cooled, ground up to about 60 mesh and mixed with 100 parts of 60 mesh phthalonitrile. The meat grinder is heated to 140° C. and the mixture is poured into the hopper of the meat grinder. The screw of the meat grinder is turned at a speed sufficient to allow completion of the reaction with a hold up of approximately three minutes. A fine cutting discharge blade is used and the reaction product obtained is a granular deep blue material which is mixed with 100 parts of 20% sulfuric acid, slurried, and the copper phthalocyanine is filtered out. The product is primarily in the old red shade form.

The product is first dried and then one part of the crude copper phthalocyanine is dissolved in 15 parts of concentrated sulfuric acid and then drowned in 100 parts of a mixture of equal weight of ice and water. The red shade copper phthalocyanine pigment thus obtained is removed by filtration and dried. A yield of about 85% based on phthalonitrile usage is obtained.

*Example 4*

Following the method given in Example 15 of said Muehlbauer U.S. Patent 2,212,924, a mixture of 100 parts of phthalonitrile, 300 parts of urea, and 40 parts of cuprous chloride are intimately mixed. The mixture is fused at about 120° C. in a beaker with stirring. The formation of copper phthalocyanine sets in and the temperature rises to about 200° C. and the melt solidifies. The crude product is pulverized, boiled with dilute hydrochloric acid, washed, and dried. The product is essentially the old green shade form copper phthalocyanine and a yield of about 60% of theory is obtained.

*Example 5*

CONVERSION OF "R" FORM TO OLD GREEN SHADE FORM

One hundred and fifty grams of copper phthalocyanine as recovered from the reaction mixture after leaching in Example 2 containing 50% "R" form and dried is ground in a small dough mixer at 55 to 60° C. with 60 milliliters of aniline. Two milliliter portions of aniline are added from time to time to maintain grindability. A total of 24 milliliters are used. After three hours of grinding the product is diluted in water and the old green shade copper phthalocyanine produced is separated by filtration, and the product dried. The ground copper phthalocyanine is essentially all of the old green shade form. The infra-red and X-ray difffraction courves are the same as those above referred to for the old green shade form.

*Example 6*

WORM THREAD MIXER

A mixture of 100 parts phthalonitrile, 92.5 parts of urea, and 35.5 parts of cupric chloride is treated in a worm thread type meat grinder as in Example 3. After acid pasting, an overall yield of 80% based on phthalonitrile usage of the red-shade copper phthalocyanine blue is obtained.

*Example 7*

WORM THREAD MIXER

A mixture of 100 parts phthalonitrile, 106 parts urea, and 27.1 parts cupric chloride is treated as in Example 3. A total yield of 86% based on phthalonitrile usage is obtained of acid leached copper phthalocyanine.

I claim:
1. A solvent stable, tinctorially strong, unsubstituted copper phthalocyanine pigment, in the "R" form, the particles of which are characterized by (1) having an average size of less than two microns, (2) being crystalline in structure, (3) when exposed to X-rays in an X-ray diffraction apparatus having a diffraction pattern with the line of maximum intensity corresponding to an interplanar spacing of 11.6 A., the second most intense line corresponding to a spacing of 9.66 A., and a third line at 3.14 A., (4) when subject to infra-red radiation having characteristic absorption maxima at 11.49, 12.91 and 13.74 microns, and (5) yielding the conventional red-shade form pigment when subjected to acid pasting.

2. A method of producing a solvent stable, tinctorially strong, unsubstituted copper phthalocyanine pigment, in the "R" form, the particles of which are characterized by (1) having an average size of less than two microns, (2) being crystalline in structure (3) when exposed to X-rays in an X-ray diffraction apparatus having a diffraction pattern with the line of maximum intensity corresponding to an interplanar spacing of 11.6 A., the second most intense line corresponds to a spacing of 9.66 A., and a third line at 3.14 A., (4) when subject to infra-red radiation having characteristic absorption maxima at 11.49, 12.91 and 13.74 microns, and (5) yielding the conventional red-shade form pigment when subjected to acid pasting, which comprises: heating within the range of about 140° C. and about 300° C., and thereby reacting, a dry mixture of 100 parts of phthalonitrile, about 50 to 100 parts of urea, and about 27 to 100 parts of a copper reagent selected from the group consisting of free copper, copper oxides and copper salts, and simultaneously agitating the mixture under conditions of high shear.

3. The method of claim 2 in which the copper reagent is cupric chloride.

4. The method of claim 2 in which the dry mixture is continuously charged to a heating and agitating zone, continuously heating and agitating said mixture in said zone, and continuously discharging the reacted mixture containing said pigment from said zone.

5. The method of claim 4 in which the retention time in the heating and agitating zone is at least about one minute.

References Cited in the file of this patent

UNITED STATES PATENTS

| | | |
|---|---|---|
| 2,153,300 | Dahlen et al. | Apr. 4, 1939 |
| 2,212,924 | Muehlbauer | Aug. 27, 1940 |
| 2,382,441 | Reynolds et al. | Aug. 14, 1945 |

OTHER REFERENCES

Barrett et al.: Jour. Chem. Soc. of London (1936), pages 1719–1726.

Lubs: Chemistry of Synthetic Dyes and Pigments, Reinhold, New York, New York (1955), page 609.

UNITED STATES PATENT OFFICE
CERTIFICATE OF CORRECTION

Patent No. 3,051,721                              August 28, 1962

Frederick L. Pfeiffer

It is hereby certified that error appears in the above numbered patent requiring correction and that the said Letters Patent should read as corrected below.

Column 1, line 26, for "phthalohyanine" read -- phthalocyanine --; same column, line 68, for "Publishhing" read -- Publishing --; column 2, line 44, for "crysals" read -- crystals --; column 3, line 23, for "sold" read -- old --; column 4, line 28, for "speical" read -- special --; column 5, line 34, for "affect" read -- effect --; column 6, line 63, for "resistance" read -- resistant --; column 7, line 2, after "R" insert -- form --; column 8, line 34, for "from" read -- form --; column 9, line 10, for "100" read -- 1000 --.

Signed and sealed this 26th day of February 1963.

(SEAL)
Attest:

ESTON G. JOHNSON
Attesting Officer

DAVID L. LADD
Commissioner of
Patents